No. 873,592. PATENTED DEC. 10, 1907.
P. A. PETERSON & J. M. HAINES.
HORSE DETACHER.
APPLICATION FILED DEC. 19, 1906.

2 SHEETS—SHEET 1.

Witnesses
Frank B. Hoffman

Inventors
Peter A. Peterson,
James M. Haines.
By Victor J. Evans
Attorney

No. 873,592. PATENTED DEC. 10, 1907.
P. A. PETERSON & J. M. HAINES.
HORSE DETACHER.
APPLICATION FILED DEC. 19, 1906.
2 SHEETS—SHEET 2.
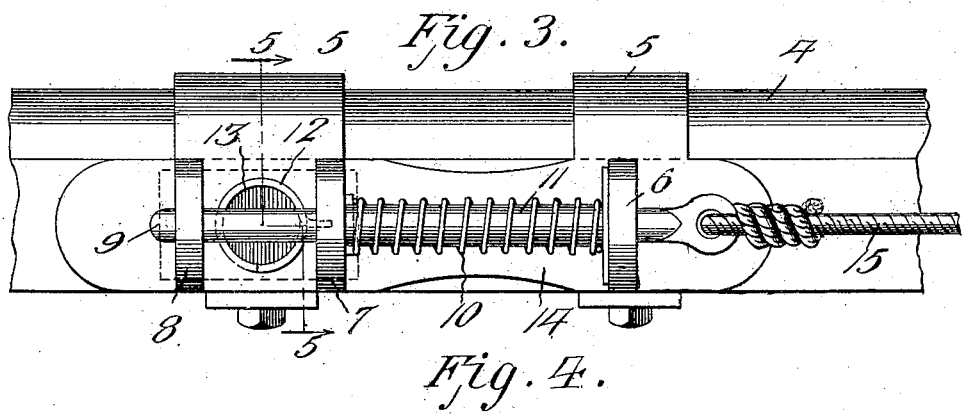
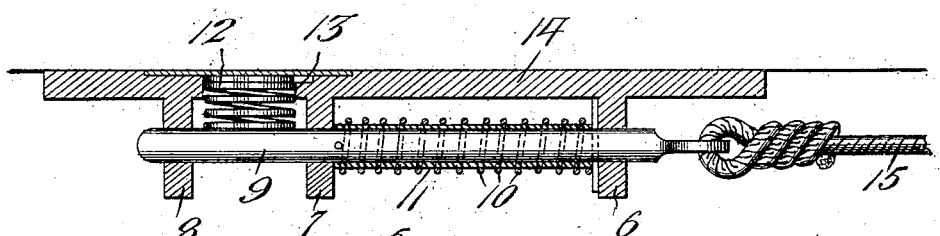
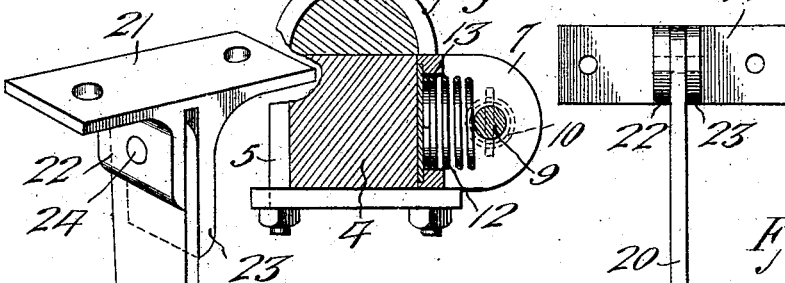
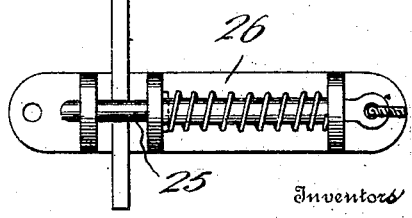
Witnesses
Frank B. Hoffman
Inventors
Peter A. Peterson,
James M. Haines.
By Victor J. Evans
Attorney

UNITED STATES PATENT OFFICE.

PETER A. PETERSON AND JAMES M. HAINES, OF CEDAR RAPIDS, IOWA.

HORSE-DETACHER.

No. 873,592.      Specification of Letters Patent.      Patented Dec. 10, 1907.

Application filed December 19, 1906. Serial No. 348,590.

*To all whom it may concern:*

Be it known that we, PETER A. PETERSON and JAMES M. HAINES, citizens of the United States of America, residing at Cedar Rapids, in the county of Linn and State of Iowa, have invented new and useful Improvements in Horse-Detachers, of which the following is a specification.

This invention relates to horse detachers, and the principal object of the same is to provide simple, reliable and efficient means for detaching a horse from a vehicle when he becomes unruly and shows a tendency to bolt.

Another object of my invention is to provide means for preventing the vehicle from turning to one side or the other after the horse has been detached from the vehicle.

When a horse has been detached from a vehicle which is traveling at a rapid rate, the vehicle is liable to turn to one side or the other and injure the vehicle and occupants of the same.

One of the objects of our invention is to provide means whereby the vehicle will be kept in the middle of the road or street or in line in which it is traveling at the time the horse is detached therefrom.

Figure 1:
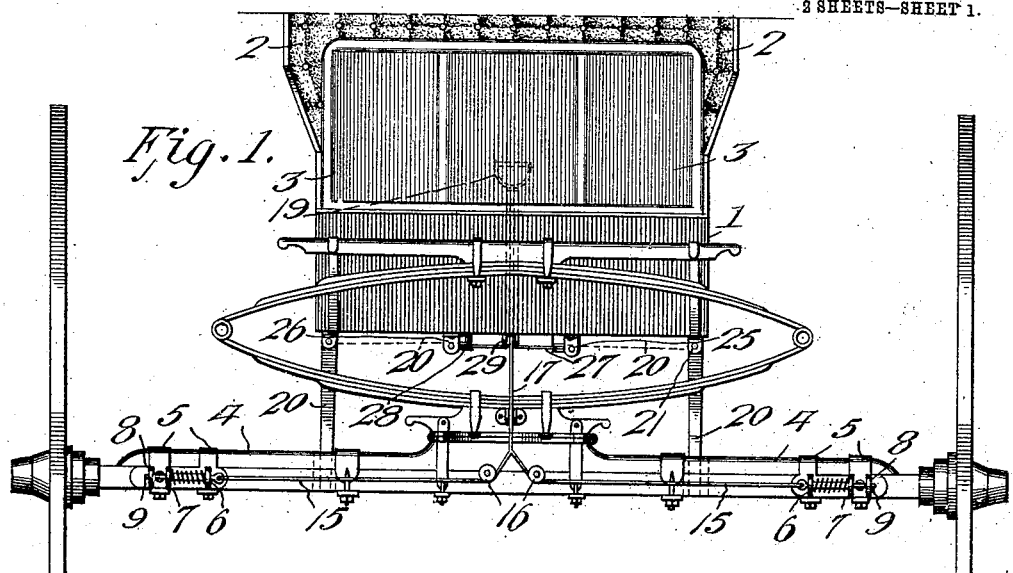
Figure 2:
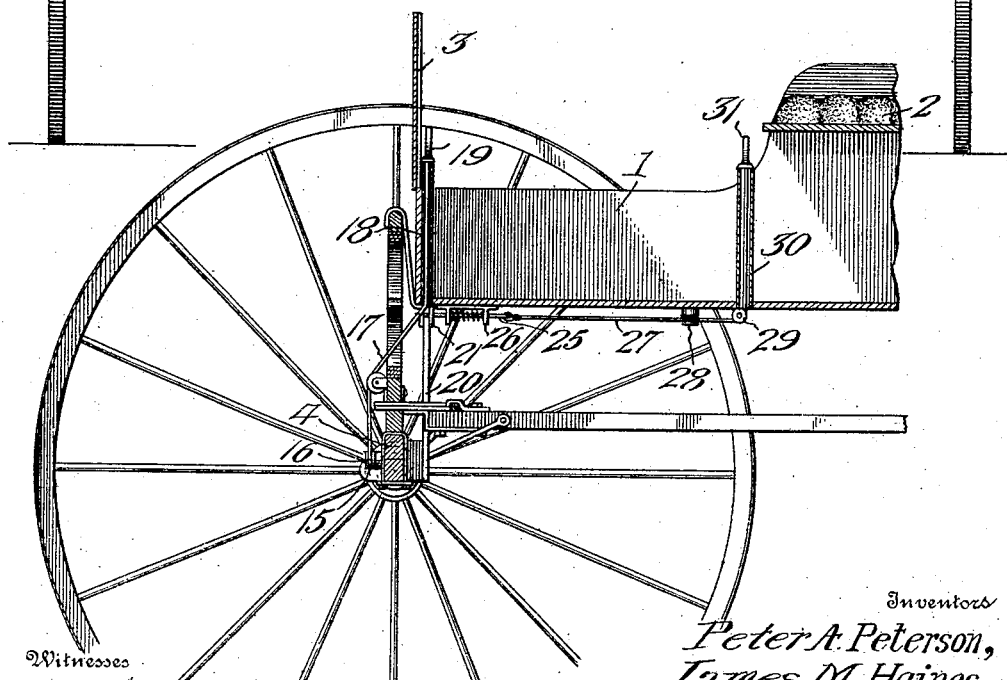

The objects and advantages referred to may be attained by means of the construction illustrated in the accompanying drawings, in which:

Figure 1 is a front elevation of a vehicle provided with my improvement. Fig. 2 is a vertical sectional view through the front part of the vehicle. Fig. 3 is an enlarged front elevation of one of the spring bolts for detachably securing the thills to the axle of the vehicle. Fig. 4 is a longitudinal section of the same. Fig. 5 is a vertical section on the line 5—5, Fig. 3. Fig. 6 is a detail perspective view of one of the guiding bars. Fig. 7 is a bottom plan view of one of said guiding bars held in its upper position by means of a spring bolt.

Referring to the drawings for a more particular description of our invention, the numeral 1 designates the body of the vehicle; 2 is the seat; 3 is the dashboard, and 4 is the front axle, these parts being of the usual or any suitable construction. Connected at opposite ends of the front axle by means of suitable clips 5 is a bracket having forwardly projecting lugs 6, 7 and 8, and extending through said lugs is a sliding bolt 9 provided with a surrounding spring 10, located between the lugs 6 and 7, said spring exerting its stress to project the bolt 9 through the openings in the lugs 7 and 8. Between the spring and the bolt 9 an india rubber sleeve 11 may be provided to prevent the parts from rattling, and a spring 12 is seated in an opening 13 in the base portion 14 of the spring bolt bracket, the purpose of said spring being to force the thill clips out when the bolts 9 have been withdrawn. Flexible cords or ropes 15 are connected to the bolts 9 and extended inwardly around pulleys 16 near the center of the axle 4 where they are united and extended upward, as at 17, through a tube or sleeve 18 secured to the bottom or floor of the body portion 1 of the vehicle and extending up in rear of the dashboard 3, a handle 19 being connected to the upper end of said flexible connection within easy reach of the driver.

From the foregoing it will be obvious that when it is desired to disconnect the thills from the bolts 9, the driver grasps the handle 19 and pulls upward until the bolts 9 are withdrawn from the lugs 7 and 8, and the spring 12 then forces the thill clips out to detach the horse from the vehicle.

In order to prevent the vehicle from running to one side or the other after the horse has become detached, I have provided a pair of guide bars 20 pivotally connected at opposite sides underneath the vehicle box upon brackets 21, said brackets being secured underneath the vehicle body and provided with spaced lugs 22, 23 between which the guide bars 20 are pivotally connected upon the pin or screw 24. It is to be noted that the lug 23 extends beyond the lug 22 for the purpose of bracing the bar 20.

Referring to Fig. 2 it will be seen that a spring bolt 25 is mounted in a bracket 26 secured underneath the body of the vehicle, said bolt being adapted to hold the bar 20 up in horizontal position underneath the vehicle body, as shown in dotted lines, in Fig. 1. A flexible cord or rope 27 leads from the bolt 25 around pulleys 28 and 29 up through a sleeve or tube 30 immediately in front of the seat 2, said cord or rope being provided with a handle 31 for withdrawing the bolts 25. When the handle 31 is raised, the bolts 25 are withdrawn and the bars 20 drop from the position shown in dotted lines in Fig. 1 to the full line positions shown in said figure, the result being that the axle 4 is held in true transverse position to prevent the vehicle from running to one side or the other, as will be understood. The cords 15 and 27 may be connected for simultaneous operation.

From the foregoing it will be noted that a horse detacher made in accordance with my invention is of simple construction, is composed of comparatively few parts, which cannot readily get out of order, and which will not permit the vehicle to be broken in case of runaway accidents.

Having thus described the invention, what I claim is:

1. In a horse detacher, means for disconnecting the thills from the front axle, in combination with guide bars pivotally connected to brackets at opposite sides of and under the vehicle body, said guide bars being normally held out of operative position by spring bolts and means for releasing said guide bars and permitting them to drop to a position back of the front axle, to prevent the same from turning upon the fifth wheel, substantially as described.

2. In a horse detacher, means for disconnecting the thills from the front axle, in combination with guide bars pivotally connected to brackets under the vehicle body, spring seated bolts for holding said guide bars in horizontal positions, and flexible connections attached to said bolts and leading to a position within reach of the driver for withdrawing said bolts, and permitting said guide bars to drop behind the front axle on opposite sides of the fifth wheel, substantially as described.

In testimony whereof, we affix our signatures in presence of two witnesses.

PETER A. PETERSON.
JAMES M. HAINES.

Witnesses:
FRANK L. BUSER,
ELMER I. JONES.